United States Patent
Zahorec et al.

(10) Patent No.: US 8,192,118 B2
(45) Date of Patent: Jun. 5, 2012

(54) STOWABLE STORAGE NET

(75) Inventors: Christopher Zahorec, Troy, MI (US); Brian Bateman, Troy, MI (US)

(73) Assignee: Exco Automotive Solutions L.P., Troy, MI (US)

( * ) Notice: Subject to any disclaimer, the term of this patent is extended or adjusted under 35 U.S.C. 154(b) by 153 days.

(21) Appl. No.: 12/781,081

(22) Filed: May 17, 2010

(65) Prior Publication Data

US 2010/0290856 A1 Nov. 18, 2010

Related U.S. Application Data

(60) Provisional application No. 61/179,090, filed on May 18, 2009.

(51) Int. Cl.
*B60P 7/08* (2006.01)

(52) U.S. Cl. ......................... 410/89; 410/118

(58) Field of Classification Search .............. 410/96, 410/97, 100, 89, 117, 118, 129; 224/563, 224/404, 314, 318; 87/2
See application file for complete search history.

(56) References Cited

U.S. PATENT DOCUMENTS

| | | |
|---|---|---|
| 3,552,613 A | 1/1971 | Nye |
| 5,340,004 A | 8/1994 | Moore |
| 5,368,210 A | 11/1994 | Wotring |
| 5,427,486 A * | 6/1995 | Green .................. 410/118 |
| 5,531,366 A | 7/1996 | Strom |
| 5,542,591 A | 8/1996 | Moore et al. |
| 5,685,470 A | 11/1997 | Moore |
| 5,868,295 A | 2/1999 | Carriere |
| 5,924,611 A | 7/1999 | Mizuno |
| RE36,345 E | 10/1999 | Moore |
| 6,030,160 A | 2/2000 | Moore |
| 6,334,562 B1 | 1/2002 | Ament et al. |
| 6,543,659 B2 | 4/2003 | Blair |
| 6,550,654 B1 | 4/2003 | Crago |
| 6,719,347 B2 | 4/2004 | Gehring et al. |
| 6,722,542 B2 | 4/2004 | McMurray et al. |
| 6,983,970 B2 | 1/2006 | Bateman |
| 7,080,677 B2 | 7/2006 | Nolle |
| 7,086,816 B2 | 8/2006 | Nolle |
| 7,147,416 B2 | 12/2006 | Cucknell et al. |
| 7,287,905 B2 | 10/2007 | Schwarzbich |
| 7,318,617 B1 | 1/2008 | Scotton |
| 2002/0043543 A1 | 4/2002 | McMurray et al. |
| 2005/0011922 A1 | 1/2005 | Nolle |

FOREIGN PATENT DOCUMENTS

WO  9322161  11/1993

* cited by examiner

*Primary Examiner* — Stephen Gordon
(74) *Attorney, Agent, or Firm* — Young Basile

(57) ABSTRACT

Disclosed herein are embodiments of a stowable storage net and a vehicle with a stowable storage net. The storage net comprises a storage area having a front, a back and two sides, the front and back being pivotally connected at one end. Elements are included for providing a predetermined amount of longitudinal elasticity to the storage area. The storage net comprises elements for removably attaching the storage area to a desired surface of the cargo area. The storage net further comprises a storage pouch forming the bottom of the storage net, the two sides of the storage net pivotally mounted proximally to the ends of the storage pouch and configured to fold into the storage pouch, allowing the associated net to fall easily and neatly into the pouch. The storage pouch can further comprise a zipper or other type of closure. Methods and vehicles are also disclosed.

9 Claims, 6 Drawing Sheets

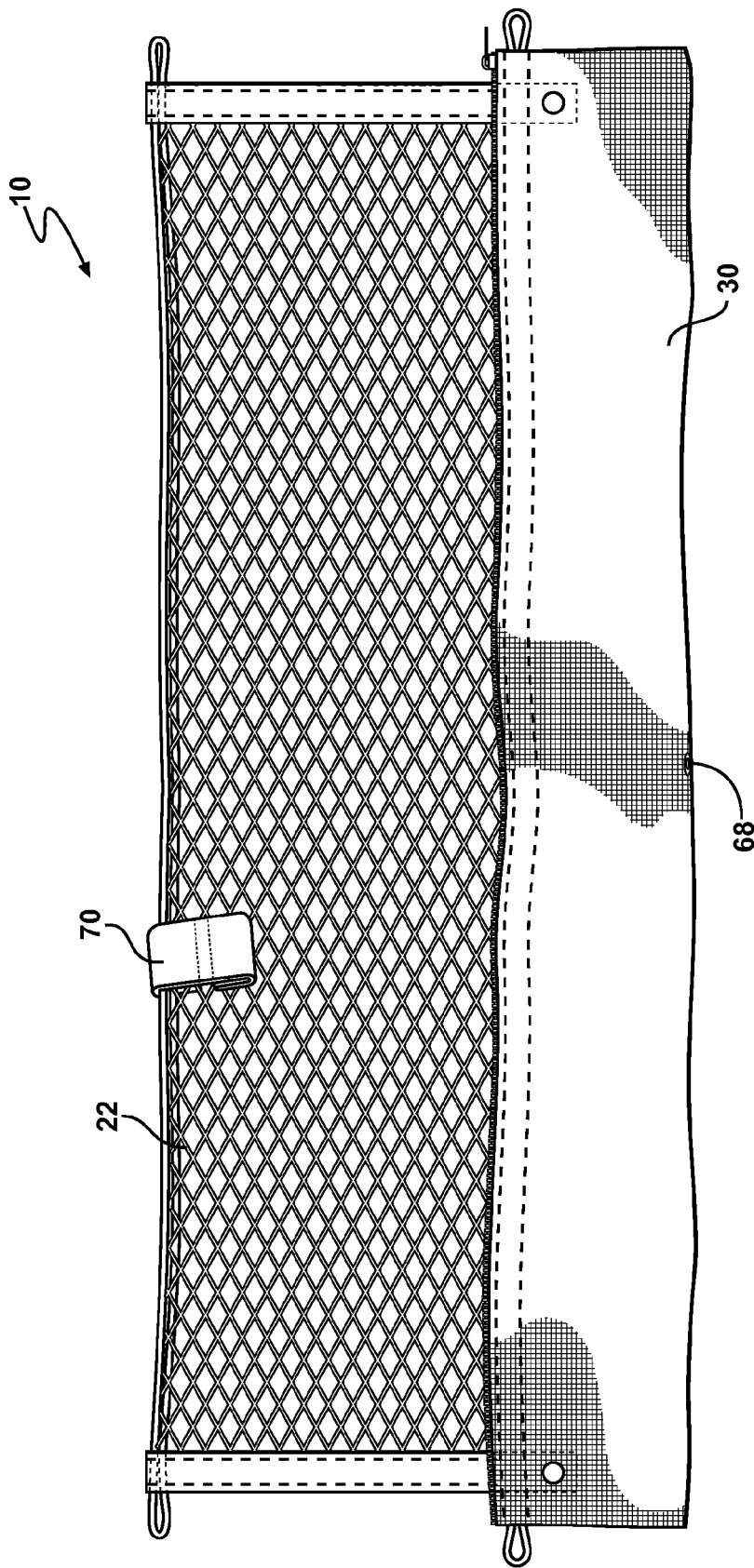

STOWABLE STORAGE NET

CROSS-REFERENCE TO RELATED APPLICATION

This application claims priority to U.S. Provisional Patent Application No. 61/179,090, filed May 18, 2009, the entire contents of which is incorporated herein by reference.

FIELD OF THE INVENTION

The present invention relates in general to automotive storage and load retention nets, and more particularly to such nets that can be easily stowed.

BACKGROUND

Consumers continually seek more efficient, convenient and versatile ways to transport contents such as cargo to be stowed in a motor vehicle such as a sedan or truck. Conventional means of stowage/cargo transport has consisted mainly in the non-compartmentalized trunk space of the sedan or open bed of the truck. This means has served its purpose satisfactorily, however, several drawbacks exist. One disadvantage is that the cargo is freely movable within the stowage compartment such as the trunk, and can be damaged in the event of a sudden stop. Even if cargo is not damaged but rolls toward the back of the trunk, persons of smaller stature have a difficult time retrieving it. Further, it is difficult to transport a mixture of heavy items with more delicate or fragile items in one large compartment.

Automotive storage nets have been developed which will advantageously provide safety to contents to be stowed in the vehicle. The automotive nets can be expandable to receive a sufficient amount of stowage, yet non-elastic enough to prevent stowed items within the net from moving more than a predetermined distance. These nets typically span the width of the trunk space or truck bed. When attempting to use the cargo area behind an empty storage net, the storage net often obstructs clear access to such an area. The storage nets can be unhooked and placed to the side; however, items placed in the trunk or bed often get tangled in the net. The storage nets can also get caught when trying to close the trunk or bed, causing inconvenience to the user. An unhooked storage net may fly out of a moving open truck bed.

For these reasons, it is desirable to have a means to properly and conveniently store the automotive storage net when not in use while leaving it easily accessible for when it is desired or required.

BRIEF SUMMARY

Disclosed herein are embodiments of a stowable storage net. The embodiments herein address and solve the above-mentioned problems by providing a stowable storage net useful in, for example, the cargo area of a motor vehicle. The storage net comprises a pouch having an interior accessible from a top portion, the pouch configured to extend between two surfaces. A net has an open top and two closed sides, each closed side having a pouch end and a free end. The net extends from the pouch with each pouch end movably attached inside opposing ends of the pouch such that each free end is opposite the pouch. Means for removably attaching the pouch and each closed side of the net to each of the surfaces is provided. Means for closing the pouch along the top portion is also provided. The closed sides of the net are configured to move to the interior of the pouch along with the net such that the top portion of the pouch can be closed with the net in the interior.

Also disclosed herein are motor vehicles utilizing the stowable storage net. One embodiment comprises a cargo area having opposing sides each with at least one attachment member and a stowable storage net. The stowable storage net comprises a pouch having an interior accessible from a top portion, the pouch configured to extend between the opposing sides of the cargo area. A net has an open top and two closed sides, each closed side having a pouch end and a free end. The net extends from the pouch with each pouch end movably attached inside opposing ends of the pouch such that each free end is opposite the pouch. Means for removably attaching one or more of the pouch and each closed side of the net to an attachment member is provided. Means for closing the pouch along the top portion is also provided. The closed sides of the net are configured to move to the interior of the pouch along with the net when not removably attached to the attachment member such that the top portion of the pouch can be closed with the net in the interior.

Also disclosed herein are methods of stowing a storage net when not in use. One such method comprises detaching the pouch and the net from one or more attachment locations, wherein the net has an open top and two closed sides, each closed side being reinforced with a sheath having a pouch end and a free end, wherein the net extends from the pouch with each pouch end of the sheath pivotally attached inside opposing ends of the pouch such that each free end is opposite the pouch. The sheaths are pivotally rotated inward toward the pouch until the sheaths are entirely within an interior of the pouch. Any net remaining outside of the interior of the pouch is placed into the interior. The pouch is then closed with closure means.

BRIEF DESCRIPTION OF THE DRAWINGS

The description herein makes reference to the accompanying drawings wherein like reference numerals refer to like parts throughout the several views, and wherein:

FIG. 5 is a side view of the embodiment of the stowable storage net; and

DETAILED DESCRIPTION

Figure 1:
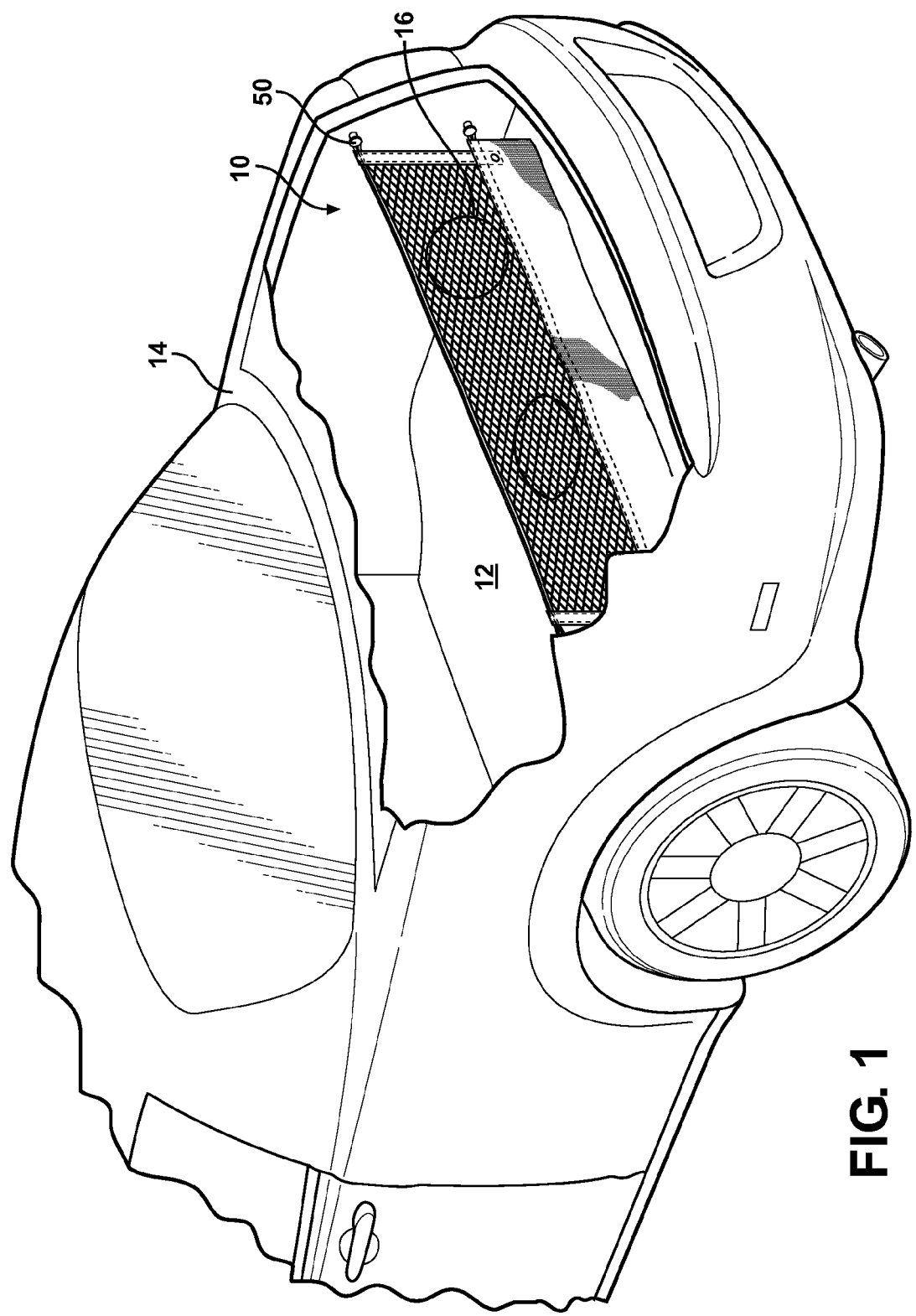
FIG. 1 is a cutaway perspective view showing an embodiment of a stowable storage net in use in the trunk of an automobile.

Referring now to FIG. 1, the stowable storage net disclosed herein is designated generally as 10. In FIG. 1, storage net 10 is shown removably mounted in the trunk compartment 12 of an automobile 14. Net 10 is shown carrying various parcels 16.

Figure 2:
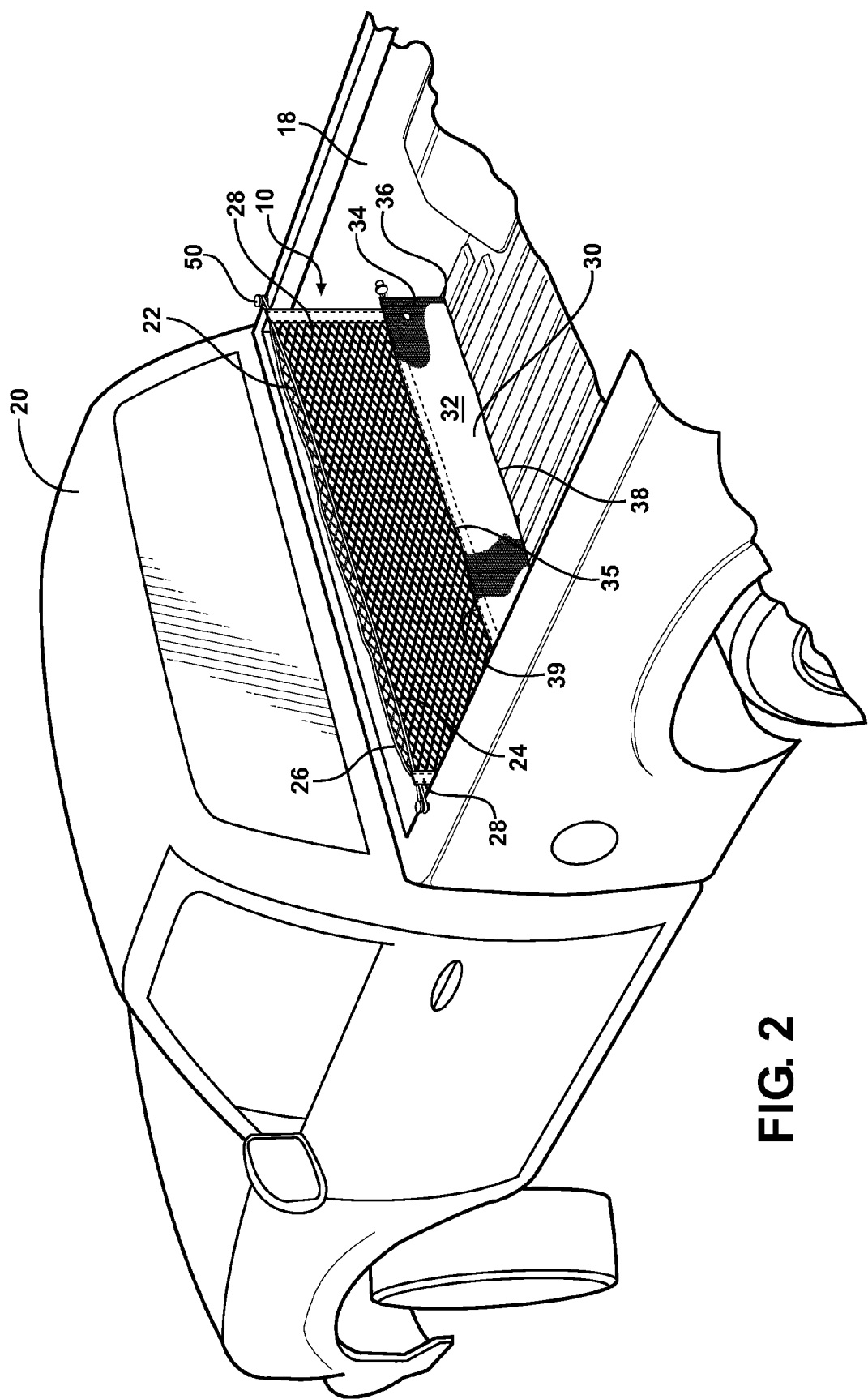
FIG. 2 is a cutaway perspective view showing the embodiment of a stowable storage net in use in the bed of a pickup truck.

Referring now to FIG. 2, storage net 10 is shown removably mounted in the cargo bed compartment 18 of a pickup truck 20. The automobile 14 and pickup truck 20 shown in FIGS. 1 and 2 are provided by way of example and are not meant to be limiting. It is contemplated that the stowable storage net 10 can be used in any other type of motor vehicle, including vans, RVs, SUVs, hatchbacks, etc.

The stowable storage net 10 comprises a storage area 22 defined by a front net 24, a back net 26, two net sides 28, and a pouch 30. The pouch 30 has a front 32, a back 34, two sides 36 and a bottom 38. The front net 24 and back net 26 are each connected at one end 34 to the front 32 and back 34 of the pouch 30, respectively. The front net 24 and back net 26 can be attached or connected at one end 39 to the front 32 and back 34 of the pouch 30 by any suitable means, such as stitching or mechanical tacking. The attachment should be made on the interior sides of the front 32 and back 34 of the pouch 30 so that the outside edges 35 of the front 32 and back 34 can support closure means 37 (shown in FIG. 3) for the pouch 30, as described later herein. It is also contemplated that the front net 24 and back net 26 be integral and continue along the interior of the pouch 30 rather than ending just interior of the pouch 30.

In this embodiment, the two net sides 28 are each closed to define an envelope like storage area 22. The two sides 36 of the pouch 30 are also closed to continue the envelope like storage area 22.

The front net 24 and back net 26 may be formed of two separate pieces, or may be formed from one, integral piece such that ends of the integral piece are enjoined to form a seam, for example, at one of the two sides 28. The front net 24 and back net 26 may be formed of any suitable material. For example, the material can be lightweight, woven mesh netting. This strong yet lightweight material can be formed from a nylon material, or any other suitable synthetic or natural material.

The pouch 30 may all be formed of any suitable material such as a textile material. One non-limiting example of a material suitable for use is a reinforced multi-filament polypropylene or polyester. The pouch 30 may be made of a single piece of material or more than one piece of material. The bottom 38 of the pouch 30 can be envelope like such as that shown in FIGS. 1 and 2. However, it is contemplated that the bottom 38 of the pouch 30 can also have a flat portion, such as in the shape of a canoe.

Figure 3:
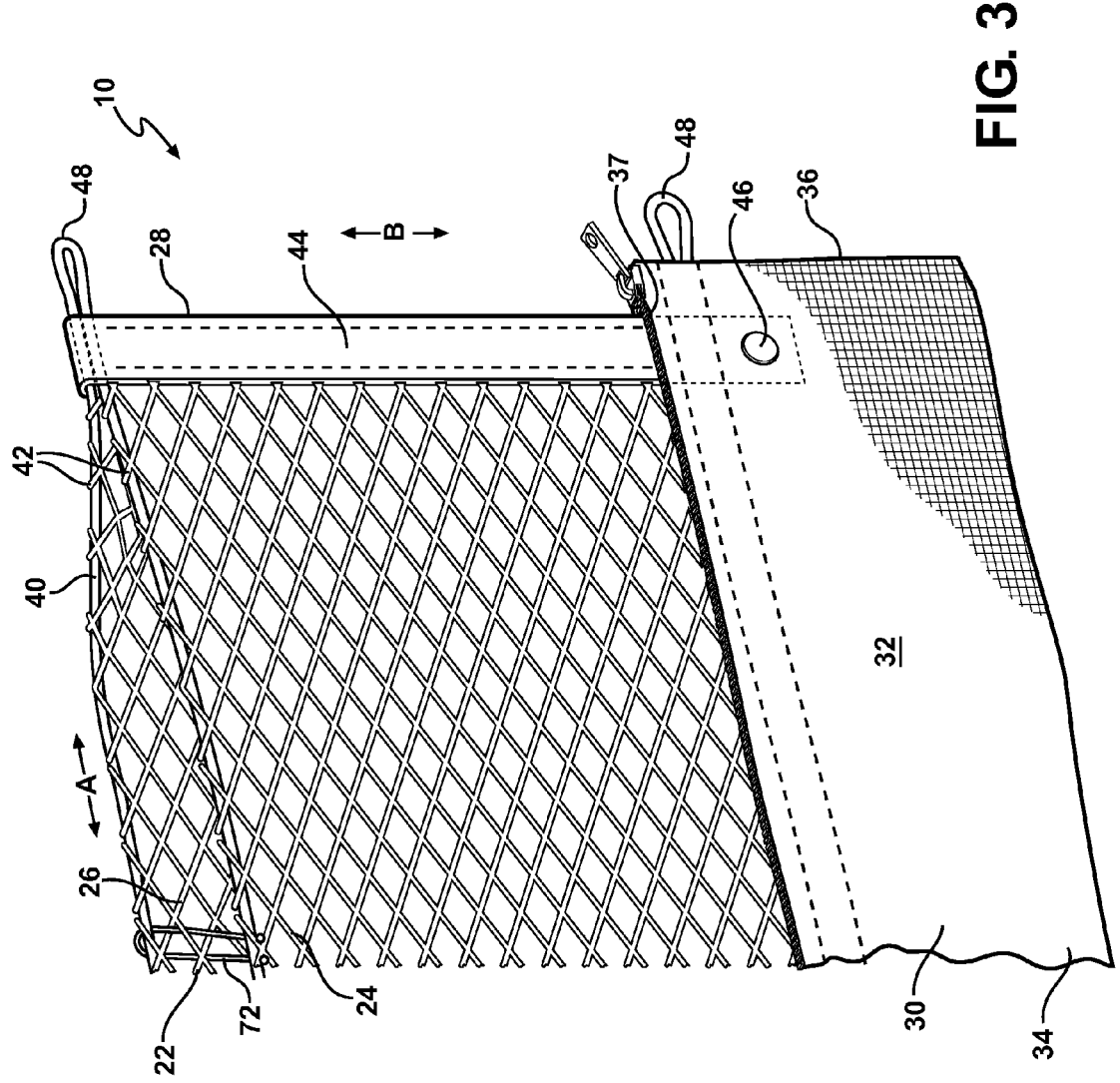
FIG. 3 is an enlarged, cutaway perspective view of one end of the embodiment of the stowable storage net in an unstowed position.

FIG. 3 is an enlarged, cutaway perspective view of one end of the embodiment of the stowable storage net 10 in an unstowed position. In this embodiment, the stowable storage net 10 further comprises means for providing a predetermined amount of longitudinal elasticity to storage area 22. The longitudinal elasticity enables storage area 22 to move in the direction of double arrow A. It is to be understood that the longitudinal elasticity means may comprise any suitable means, and the amount of elasticity will be determined according to the particular requirement necessitated by the desired end use. As shown in FIG. 3, the longitudinal elasticity providing means comprises an elastic member 40 attached to a top end 42 of each of the front net 24 and back net 26. This elastic member 40 may comprise any suitable means. By way of example, the elastic member 40 comprises an elastic cord threaded through the top end 42 of each of the front net 24 and back net 26 of the storage area 22. This elastic cord may be formed of any suitable material. For example, the cord shown is formed of a Bungee-type cord.

The elastic member 40 can span the entire length of the front net 24 and back net 26 as shown. The elastic member 40 may be one integral piece or may be more than one piece. It is contemplated that the elastic member 40 may only span a portion of the length of the front net 24 and/or back net. Only one of the front net 24 or back net 26 may have an elastic member 40. Furthermore, it is contemplated that no elastic member be used along the top end 42.

Each net side 28 comprises a sheath 44 to which the netting is attached by any suitable means, such as stitching or mechanical tacking. The sheath 44 may be formed of any suitable material such as a textile material. For example, sheath 44 may be made from a reinforced multi-filament polypropylene or polyester. The sheath 44 may be reinforced if desired or required with, for example, an insert of a suitable material, such as plastic.

Each sheath 44 is pivotally attached at its lower end to the pouch 30 proximate each side 36 of the pouch 30. The sheath 44 can be pivotally attached through both the front 32 and back 34 of the pouch 30 or through one of the front 32 and back 34 of the pouch 30. Each sheath 44 can be pivotally attached by any suitable means 46. For example, the connection may be a snap. The connection may be a grommet in the sheath 44 through which a pin connected to one or both of the front 32 and back 34 extends.

In this embodiment, the elastic member 40 is not shown threaded through the sheath 44. However, it is contemplated that the elastic member 40 can be threaded through the sheath 44 to span the height of the net side 28, providing a predetermined amount of transverse elasticity to storage area 22. This means would allow elasticity in the direction of double arrow B. The elastic member 40 may freely move within sheath 44 and may be threaded within the mesh of the net side 28.

It is also contemplated that the sheath 44 may be threaded with a substantially inelastic cord. In this way, transverse elasticity is limited by the predetermined length of the inelastic cord. It is also contemplated that the sheath 44 may not be threaded with anything as shown and may only provide some rigidity to the net sides 28 of the storage area 22.

Stowable storage net 10 further comprises means for removably attaching storage area 22 to a desired surface. Net 10 may have application in many areas, but is especially suited for use in cargo areas of motor vehicles, as, for example, shown in FIGS. 1 and 2. This cargo area may be located in any area of the motor vehicle, including the passenger compartment. The attaching means may comprise any suitable means. This means may comprise loops 48 attached to one of the desired surface of cargo area and the storage area 22, and hooks 50 (shown in FIGS. 1 and 2), or any other suitable fastener, attached to the other of the desired surface and the storage area 22. In the embodiment shown in FIGS. 1-3, loops 48 are attached to the storage area 22 at its two top corners and at the two top corners of the pouch 30 and are fastened to hooks 50 shown in FIGS. 1 and 2. It is contemplated that the loops 48 be located proximate the four corners or only proximate the two top corners. Further, center loops (not shown) are optionally provided to prevent sagging of the net, and are especially useful when extending along the side of a passenger compartment, truck bed, etc. The loops can be located on the net 10 as desired or required.

The loops 48 can be comprised of elastic member 40. The loops 48 can be continuous elastic material used to form the elastic member 40 of one or both of the net sides 28 and the top ends 42. The loops 48 can be the only elastic member 40 of the storage area 22 or can be in addition to one or both of elastic members on the net sides 28 and the top ends 42. It is contemplated that the loops 48 can be made of an inelastic material, such as cord or an arrangement of VELCRO brand fasteners. The cord may terminate in loops extending out of the top of the sheath 44. A number of the loops can be comprised of the elastic member 40 and a number can be made from inelastic material.

The elastic or inelastic material, if used, can continue out the bottom of the sheath 44 through an opening proximate a corner of the pouch 30 to form a loop 48 if required or desired. Alternatively, a loop 48 or the like can be attached to the pouch directly proximate each corner.

Figure 4A:
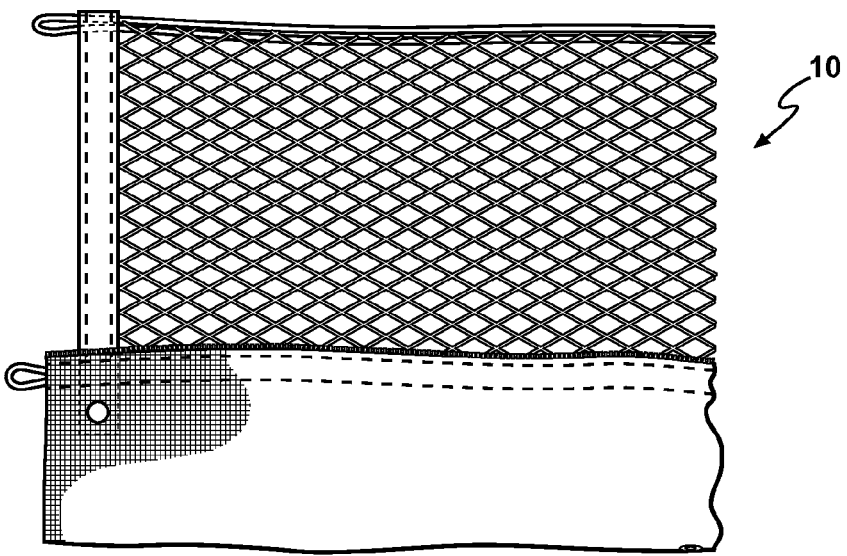
FIG. 4A is an enlarged, cutaway perspective view of one end of the embodiment of the stowable storage net in an unstowed position.
Figure 4B:
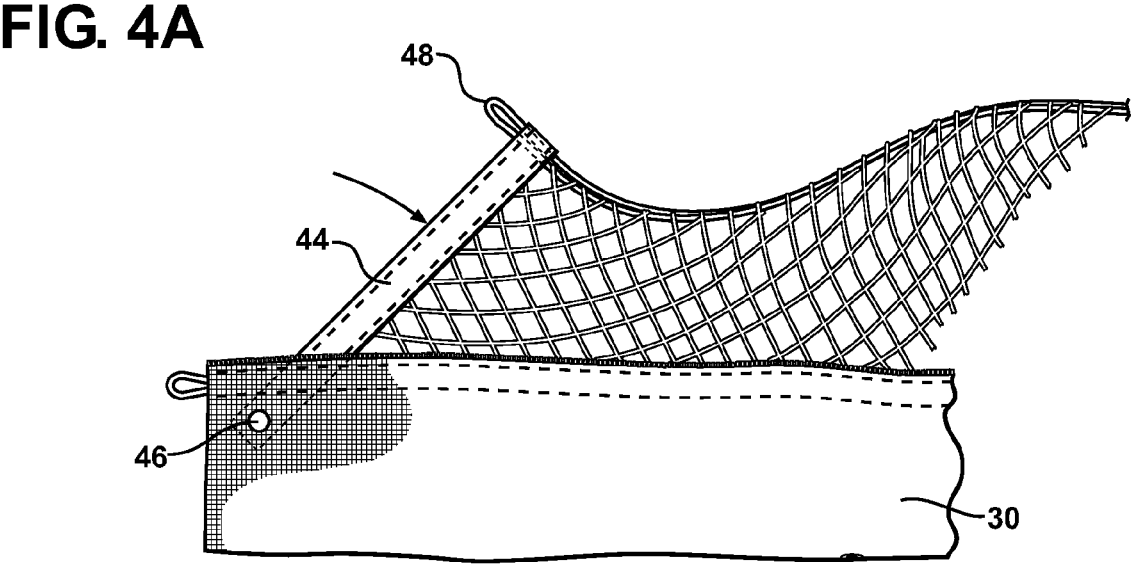
FIG. 4B is a side view of the embodiment of a stowable storage net as the net is being stowed.
Figure 4C:
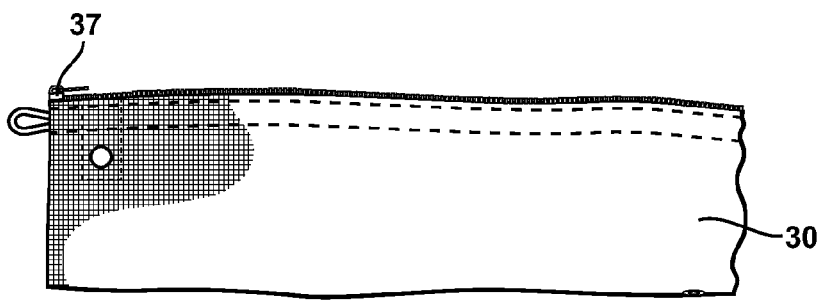
FIG. 4C is the side view of FIGS. 4A and 4B with the embodiment of the stowable storage net stowed in the pouch.

FIG. 4A is an enlarged cut away side view of the embodiment of a stowable storage net prior to it being stowed, FIG. 4B is the same view of FIG. 4A with the embodiment in the process of being stowed, and FIG. 4C is the same view of the stowable storage net stowed in the pouch.

In FIG. 4A, the stowable storage net 10 is shown in the unstowed, ready to use position. When a user would like to stow the storage net 10, he or she unhooks loops 48 and begins to rotate the sheaths 44 around the respective pivotal attachments 46 toward the interior of the pouch 30. As the sheaths 44 are rotated, the front net 24 and back net 26 of the storage area 22 fold neatly into the pouch 30, as shown in FIG. 4B. When the sheaths 44 are fully pivoted into the pouch 30, the pouch 30 can be closed with the closure means 37. The closure means 37 can be any suitable means, such as a zipper, snaps, buttons, hook and loop material, ties and the like.

Figure 6:
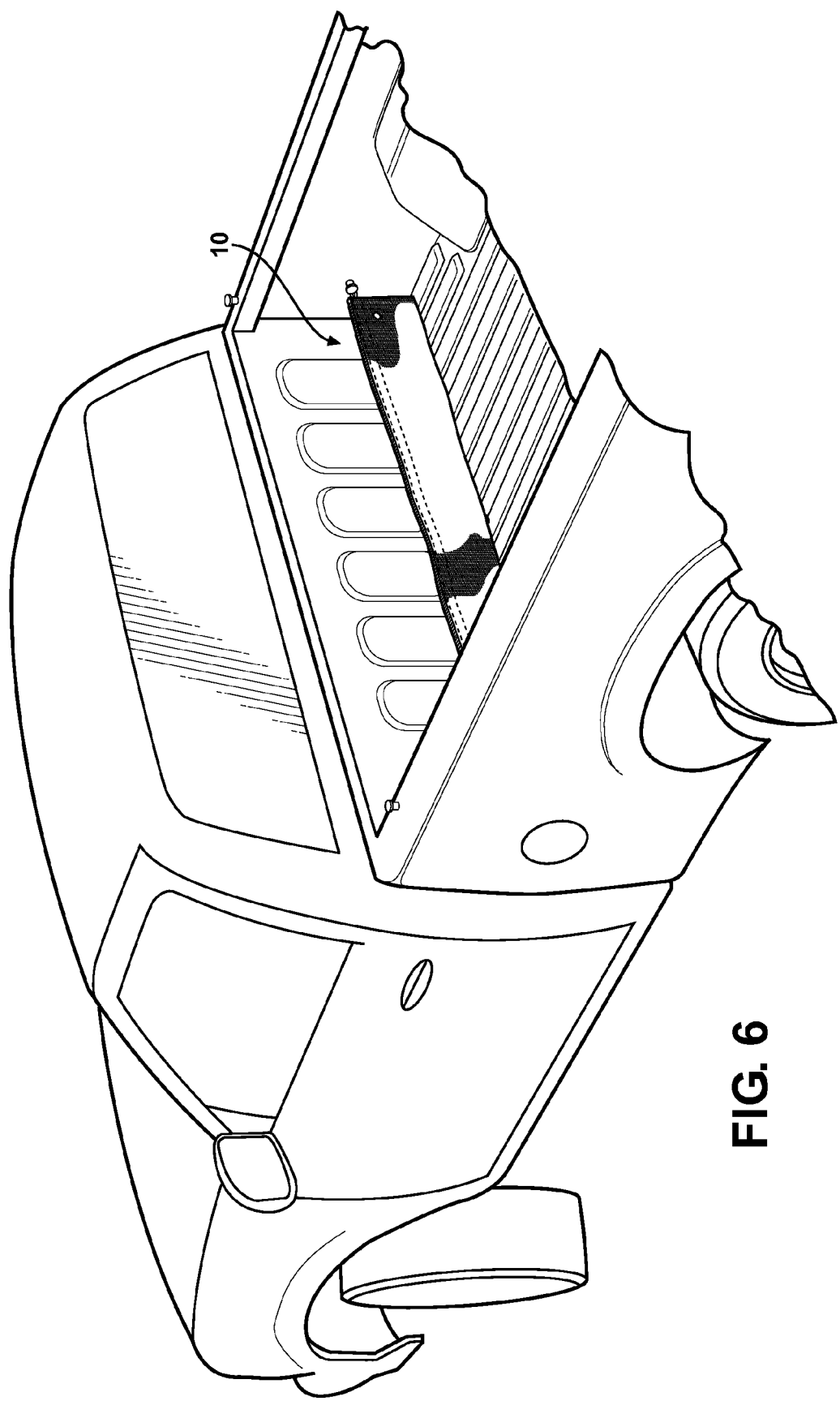
FIG. 6 is a cutaway perspective view showing the embodiment of a stowable storage net in place in the bed of the pickup truck and in the stowed position.

FIG. 5 is an entire side view of the stowable storage net in its ready to access position. FIG. 6 is a cutaway perspective view showing the embodiment of a stowable storage net in place in the bed of the pickup truck and in the stowed position. The stowed net can be left removably attached as shown, or the stowed net can be removed from the cargo area and stored somewhere else.

Embodiments of the stowable storage net 10 may further comprise a drain 68, shown in FIG. 5, to release any liquid or small solids such as dirt that might accumulate in the pouch 30. The drain 68 shown in FIGS. 4A and 4B is a single grommetted hole. However, this is provided by way of example and is not meant to be limiting. The drain 68 may be any suitable formation that retains the storage strength of the pouch 30 while providing a release for liquid and small solids. For example, the drain 68 may be at least a portion of the pouch 30 made from a strong and small mesh material.

Embodiments of the stowable storage net 10 may further comprise a handle 70, also shown in FIG. 5, attached to the storage area 22, to assist in adding and removing contents to and from storage area 22.

Embodiments of the stowable storage net 10 may further comprise a spacer member 72, shown in FIG. 3, removably attached to, and extending between the top ends 42 of the front net 24 and back net 27. Spacer 72 may be located at any point along edges top ends 42, such as adjacent one of the net sides 28. The spacer member 72 can be any shape suitable, for example, an inverted V-shape. The spacer 72 can be removed is desired or required by the user. Spacer 72 may be formed of any suitable material, for example, a crystalline himont polypropylene.

The stowable storage nets disclosed herein restrain items stored in the net from moving more than a predetermined distance in any direction and prevent stored objects from inadvertently leaving the net during operation of the motor vehicle. The stowable storage nets can divide a single stowage transporting area into one or more discrete and sectioned areas within the cargo area. The nets are strong and resilient, yet lightweight, and thereby preserve fuel efficiency. The pouch enables the netting to be stowed neatly without tangles when not in use, while keeping the storage net conveniently accessible when needed. Other benefits will be realized when the stowable storage nets are utilized.

A method of stowing a storage net when not in use is now described. One such method comprises detaching the pouch and the net from one or more attachment locations, wherein the net has an open top and two closed sides, each closed side being reinforced with a sheath having a pouch end and a free end, wherein the net extends from the pouch with each pouch end of the sheath pivotally attached inside opposing ends of the pouch such that each free end is opposite the pouch. The sheaths are pivotally rotated inward toward the pouch until the sheaths are entirely within an interior of the pouch. Any net remaining outside of the interior of the pouch is placed into the interior. The pouch is then closed with closure means.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A stowable storage net comprising:
 a pouch having an interior accessible from a top portion, the pouch configured to extend between two surfaces;
 a net having an open top and two closed sides, each closed side having a pouch end and a free end, wherein the net extends from the pouch with each pouch end movably attached inside opposing ends of the pouch such that each free end is opposite the pouch;
 means for removably attaching the pouch and each closed side of the net to each of the surfaces; and
 means for closing the pouch along the top portion, wherein the closed sides of the net are configured to move to the interior of the pouch along with the net such that the top portion of the pouch can be closed with the net in the interior.

2. The stowable storage net of claim 1, wherein each closed side of the net is reinforced with a sheath, with the sheath pivotally attached inside an end of the pouch.

3. The stowable storage net of claim 1, further comprising an elastic portion along at least a portion of a perimeter of the open top of the net.

4. The stowable storage net of claim 1, wherein the two surfaces are opposing sides of a truck bed or a trunk of a vehicle.

5. The stowable storage net of claim 1, wherein the means for closing the pouch along the top portion is a zipper.

6. The stowable storage net of claim 1, wherein the pouch includes a drain.

7. The stowable storage net of claim 1, further comprising a spacer member removably attached to opposing sides of the open top of the net and configured to maintain the open top of the net in an open position.

8. The stowable storage net of claim 1, wherein the net has a continuous bottom that lines a bottom of the pouch.

9. The stowable storage net of claim 1, wherein the net has a bottom edge opposite the open top, wherein the bottom edge is attached on the interior of the pouch along pouch walls and below the means for closing the pouch.

* * * * *